US009628751B2

(12) United States Patent
Johansson et al.

(10) Patent No.: US 9,628,751 B2
(45) Date of Patent: Apr. 18, 2017

(54) METHOD, DEVICE, AND SYSTEM FOR PRE-PROCESSING A VIDEO STREAM FOR SUBSEQUENT MOTION DETECTION PROCESSING (71) Applicant: Axis AB, Lund (SE)

(72) Inventors: Emanuel Johansson, Lund (SE); Mats Bylander, Sodra Sandby (SE); Jesper Bengtsson, Helsingborg (SE); Thomas Winzell, Flyinge (SE)

(73) Assignee: Axis AB, Lund (SE)

( * ) Notice: Subject to any disclaimer, the term of this patent is extended or adjusted under 35 U.S.C. 154(b) by 35 days.

(21) Appl. No.: 14/922,346

(22) Filed: Oct. 26, 2015

(65) Prior Publication Data
US 2016/0125618 A1 May 5, 2016

(30) Foreign Application Priority Data

Nov. 3, 2014 (EP) ..................................... 14191461

(51) Int. Cl.
*H04N 5/77* (2006.01)
*G06T 5/00* (2006.01)
(Continued)

(52) U.S. Cl.
CPC ............. *H04N 5/772* (2013.01); *G06T 5/002* (2013.01); *G06T 5/50* (2013.01); *G08B 13/196* (2013.01);
(Continued)

(58) Field of Classification Search
None
See application file for complete search history.

(56) References Cited

U.S. PATENT DOCUMENTS 5,764,803 A 6/1998 Jacquin et al.
5,912,815 A * 6/1999 Kim ........................ G06T 7/262
375/E7.109

(Continued)

FOREIGN PATENT DOCUMENTS

GB 2 442 512 A 4/2008

OTHER PUBLICATIONS

Extended European Search Report issued May 4, 2015 in Europe Application 14191461.4, filed on Nov. 3, 2014 (with Written Opinion).

*Primary Examiner* — Tsung-Yin Tsai
(74) *Attorney, Agent, or Firm* — Oblon, McClelland, Maier & Neustadt, L.L.P.

(57) ABSTRACT

There is provided a method for pre-processing a video stream for subsequent motion detection processing. The method comprises receiving a video stream of images, wherein each image in the video stream is represented by a first plurality of bits; enhancing the video stream of images by, for each image in the video stream: comparing the image to at least one previous image in the video stream so as to identify pixels where the image differs from the at least one previous image in the video stream, enhancing the image in those pixels where the image differs from the at least one previous image in the video stream; and converting the enhanced video stream of images so as to produce a converted video stream of images for subsequent motion detection processing, wherein each image in the converted video stream is represented by a second plurality of bits being lower than the first plurality of bits.

13 Claims, 4 Drawing Sheets (51) Int. Cl.
   *G08B 13/196*    (2006.01)
   *H04N 7/18*      (2006.01)
   *G06T 5/50*      (2006.01)
   *H04N 21/2343*   (2011.01)
   *H04N 21/4402*   (2011.01)

(52) U.S. Cl.
   CPC ... *H04N 7/183* (2013.01); *G06T 2207/10016* (2013.01); *G06T 2207/20182* (2013.01); *G06T 2207/20216* (2013.01); *G06T 2207/30232* (2013.01); *H04N 21/234354* (2013.01); *H04N 21/440254* (2013.01)

(56) References Cited

U.S. PATENT DOCUMENTS

| | | | |
|---|---|---|---|
| 6,740,879 B1 | 5/2004 | Tenhet, Jr. et al. | |
| 7,031,388 B2 * | 4/2006 | Yang | G06T 5/003 375/240.16 |
| 2002/0054211 A1 | 5/2002 | Edelson et al. | |
| 2003/0123549 A1 * | 7/2003 | Yang | H04N 19/527 375/240.16 |
| 2005/0248687 A1 * | 11/2005 | Lee | G06T 5/20 348/606 |
| 2006/0242186 A1 | 10/2006 | Hurley | |
| 2007/0139517 A1 | 6/2007 | Jenkins | |
| 2008/0158426 A1 * | 7/2008 | Chiu | G06T 7/246 348/607 |
| 2009/0167951 A1 * | 7/2009 | Chiu | H04N 5/21 348/607 |
| 2010/0091185 A1 * | 4/2010 | Ueno | G09G 3/3611 348/452 |
| 2010/0158320 A1 | 6/2010 | Chen | |
| 2013/0135468 A1 | 5/2013 | Kim et al. | |
| 2014/0064553 A1 | 3/2014 | Knauth | |

\* cited by examiner

METHOD, DEVICE, AND SYSTEM FOR PRE-PROCESSING A VIDEO STREAM FOR SUBSEQUENT MOTION DETECTION PROCESSING

TECHNICAL FIELD

The present invention relates to the field of motion detection in a video stream. In particular, it relates to pre-processing of a video stream for subsequent motion detection processing.

BACKGROUND

There is a steady increase in the demand for automatic camera surveillance. For example, it is desirable to detect motion of objects in images captured by a camera even at long distances and under difficult circumstances. For that purpose, there is a large number of motion detection engines, being automatic systems for motion detection, commercially available on the market.

A motion detection engine may e.g. run on a network device, such as a server, and one or more cameras may stream a captured video stream of images to the network device via a network for subsequent motion detection. Due to bit rate limitations when streaming the video stream of images to the network device, the captured video stream of images is typically converted, such as being compressed or converted to a lower bit depth, prior to being sent to the network device. In other words, the number of bits representing the images in the video stream is reduced prior to transmission to the motion detection engine. By way of example, each pixel in an image in the video stream may be represented by 16 bits prior to conversion and 8 bits after conversion.

Due to the limited number of bits used to represent the images in the video stream on which the motion detection engine operates, the motion detection engine will have a limited capability of detecting small objects. For example, the small objects may disappear during the bit conversion process or, due to a low contrast in or a low resolution of images in the video stream on which the motion detection engine operates, a small object may be mistaken for noise, and may hence be removed by the motion detection engine.

UK patent application GB 2 442 512 A discloses a motion detector which operates on images received from a camera, i.e. images which typically have already been subject to bit conversion. The disclosed motion detector calculates differences between a current and previous video frames so as to detect edges of moving objects. In order to accentuate moving objects in comparison to noise, the detected edges are enhanced so that edges of true moving features score more highly than random pixel changes.

GB 2 442 512 A thus proposes to make changes in the motion detection algorithm in order to enhance true moving objects in comparison to random noise. With this approach it is hence ruled out that a standard, commercially available, motion detection engine may be used. Moreover, this approach suffers from the fact that already prior to being subject to motion detection, small objects may have been removed or disappeared from the images due to the bit conversion which typically takes place in the camera.

It would thus be desirable to be able to use a standard, commercially available, motion detection engine, and still improve the result of the motion detection with respect to detection of small objects covering a few pixels in the captured images.

SUMMARY OF THE INVENTION

In view of the above, it is thus an object of the present invention to mitigate or overcome the problems discussed above. In particular, it is an object to provide a method, a device, and a system which allows a standard, commercially available, motion detection engine to be used and still improve the result of the motion detection with respect to detection of small objects.

According to a first aspect of the invention, the above object is achieved by a method for pre-processing a video stream for subsequent motion detection processing, comprising:

receiving a video stream of images, wherein each image in the video stream is represented by a first plurality of bits, enhancing the video stream of images by, for each image in the video stream:
  comparing the image to at least one previous image in the video stream so as to identify pixels where the image differs from the at least one previous image in the video stream,
  enhancing the image in those pixels where the image differs
from the at least one previous image in the video stream, and
converting the enhanced video stream of images so as to produce a converted video stream of images for subsequent motion detection processing, wherein each image in the converted video stream is represented by a second plurality of bits being lower than the first plurality of bits.

With such a method, the video stream is pre-processed prior to application of motion detection processing. This means that no modifications are required with respect to the motion detection processing, thereby allowing a standard, commercially available, motion detection engine to be used. Instead, the proposed method pre-processes the video stream so as to modify the input video stream which is subsequently subject to the motion detection processing.

More specifically, the proposed method enhances the original video stream of images captured by the camera prior to converting it to a video stream on which motion detection processing subsequently may be applied. The conversion may be seen as a bit reduction process resulting in that the number of bits used to represent each image of the video stream is decreased. In other words, the pre-processing is made on image data which includes a higher amount of information e.g. in terms of a higher contrast, and/or higher quality compared to the image data provided after the conversion operation. This enables the pre-processing to make use of the higher amount of information and, on basis thereof, enhance features in the images, such as small moving objects, which otherwise would be lost in the conversion operation or be difficult to distinguish from noise in the converted, video stream.

In more detail, the method proposes to identify pixels where an image differs from at least one previous image in the video stream, i.e. pixels which are likely to correspond to the moving edges of a moving object. The image is then enhanced in the identified pixels. Since the moving edges typically appear "around" the moving object, an object will appear to have a larger size after the enhancement, thus making it easier for the subsequent motion detection processing to detect the moving object. Notably, since the enhancement is performed early in the image flow of a camera, before the conversion, the enhancement may enhance smaller moving objects than what would be possible if a corresponding enhancement was performed after the conversion, due to the differences in information in the images before and after the conversion.

The proposed method may be particularly advantageous in case the video stream is captured by a thermal camera. Thermal cameras are great detectors and may be used to detect and classify objects at long distances and under difficult conditions. Their performance in that respect is often much better than a visual camera. However, due to limitations in calculation power and the, in general, lower resolution of thermal cameras (causing an object to be covered by fewer pixels in the captured images) this detection potential is hard to utilize in automatic systems such as motion detection. Besides, most motion detection engines are optimized for visual cameras. However, as described above, with the proposed method objects will appear larger after the pre-processing and thus help with the low-resolution problem of thermal cameras.

By a video stream of images is generally meant a temporal sequence of images.

By enhancing an image in a pixel is generally meant that the value of that pixel is increased or gained.

As used herein, an image may be said to differ from the at least one previous image in a pixel if a difference in intensity values between the image and the at least one previous image exceeds a threshold.

By converting a video stream is generally meant that the video stream is converted from a first format to a second format. In particular, it is meant a procedure which reduces the number of bits representing each image, or pixel, in the video stream. This may for example, include subjecting the video stream of images to video compression. Additionally or alternatively, the conversion may include reducing the bit depth of the images in the video stream. More specifically, each pixel of the images in the video stream may be represented by a first number of bits, and the step of converting the enhanced video stream of images may comprise converting the enhanced video stream of images such that each pixel of the images in the converted video stream is represented by a second number of bits being lower than the first number of bits. The first number of bits, i.e. the bit depth prior to conversion, may be equal to 16 bits, whereas the second number of bits, i.e. the bit depth after conversion, may be equal to 8 bits. It is to be noted that, as used herein, converting a video stream does typically not refer to reducing the spatial resolution, i.e. the number of pixels in the images in the video stream.

Since the first number of bits is larger than the second number of bits, the contrasts in images of the video stream of images is higher prior to conversion than after conversion. Due to the higher contrasts, detection and enhancement of small objects is simplified, since it e.g. becomes easier to distinguish the objects from noise.

In the step of comparing the image to at least one previous image in the video stream, the image may be compared to an image formed from the at least one previous image in the video stream. For example, an image may be formed from the at least one previous image in the video stream by forming mean values of the at least one previous image in the video stream. The image formed from the at least one previous image may thus be seen as an image which is formed by temporally filtering the at least one previous image. For different pixels in the image to be formed, a different number of previous images may be used when forming the mean values, i.e. the temporal filter may use different numbers of previous images for different pixels. In particular, the number of previous images used may be based on motion detected in the most recent one of the at least one previous image. By way of example, in case motion was detected in a particular pixel, only the most recent one of the at least one previous image may be used for that pixel when forming the image from the at least one previous image. In case no motion was detected in a particular pixel, more than one of the at least one previous image may be used for that pixel when forming the image from the at least one previous image. The motion may in this case be detected based on a comparison of the most recent of the at least one of previous image to an image formed, in accordance to the above, from at least one image preceding the most recent of the at least one of previous image. In other words, the image formed from the at least one previous image, i.e. the temporally filtered image, may be updated iteratively for each image frame in the video stream of images for the purpose of enabling motion detection.

The enhancement of the image in those pixels where the image differs from the at least one previous image in the video stream may be done in different ways. For example, in the step of enhancing the image, an offset may be added to a pixel value in those pixels where the image differs from the at least one previous image in the video stream. In this way, the contrast is increased for those pixels where motion was detected, thus making it easier for the subsequent motion detection processing to distinguish those pixels from noise.

The contrast may also be increased by, in the step of enhancing the image, multiplying a pixel value in those pixels where the image differs from the at least one previous image in the video stream by a gain factor.

As mentioned above, the enhancement step will have the effect of increasing the size of moving objects, i.e., after enhancement a moving object will appear to be larger than before enhancement. This effect may be further increased by, in the step of enhancing the image, further enhancing the image in a surrounding of those pixels where the image differs from the at least one previous image in the video stream. The surrounding may e.g. correspond to adding a frame of pixels, such as a 3×3, 5×5 or more generally a n×n pixel frame, to each pixel where the image differs from the at least one previous image in the video stream.

As further discussed above, the enhancement of the images in the video stream in those pixels which differ from the at least one previous image in the video stream makes it easier for the subsequent motion detection processing to detect motion of small objects. In particular, it will be easier for the subsequent motion detection processing to distinguish motion of a small object from random noise. In order to make it even easier for the subsequent motion detection processing to distinguish motion of a small object from random noise, the step of enhancing the video stream of images may further comprise, for each image in the video stream: noise filtering the image in those pixels where the image does not differ from the at least one previous image in the video stream. In this way, the pixels where motion occurs are enhanced, whereas pixels where no motion occurs are filtered for noise, thereby making the moving objects even easier to be distinguished from noise in the enhanced images.

The noise filtering typically comprises temporally averaging, of filtering, the image using the at least one previous image in the video stream. Notably, this resembles what was said above about the image formed from the at least one previous image in the video stream. In fact, the temporally filtered image determined with respect to one image in the video stream of images may be used as (a portion of) the image formed from the at least one previous image with respect to the subsequent image in the video stream. Thus, noise filtering and enhancement may conveniently be combined, thereby allowing an efficient implementation.

The images in the video stream may be gray-scale images, i.e. each pixel of the images in the video stream may be represented by a first number of bits in a single color channel. The pixel values of the images in the video stream thus represent intensity on a gray-scale. The images in the converted video stream may be color images, i.e. each pixel of the images of the converted video stream may be represented by a second number of bits divided between a plurality of color channels. The color channels may e.g. be a red, a green and a blue channel. In such a situation, the motion detected in the images, that is those pixels where an image in the (original) video stream of images differ from the at least one previous image in the original video stream, may e.g. be coded in color, whereas the other pixels are coded on a gray-scale. The reversed situation is of course also possible. For example, the pixels associated with motion may be coded in the green channel only, and the pixels which are not associated with motion may be coded with the same intensity in all channels. More specifically, in the step of converting the enhanced video stream of images, each image in the converted video stream may be:

assigned one of the same value in the plurality of color channels or different values in some of the plurality of color channels for those pixels where the corresponding image in the original video stream does not differ from the at least one previous image in the original video stream, and assigned the other of the same value in the plurality of color channels or different values in some of the plurality of color channels for those pixels where the corresponding image in the original video stream differs from the at least one previous image in the original video stream.

In this way, the pixels associated with motion will stand out in comparison to the pixels which are not associated with motion, due to the color coding. This will further improve detection capabilities of the motion detection processing since areas where there is motion is further distinguished from other areas. Moreover, it may be used to visualize where the motion in the image is present.

In some embodiments, the motion detection processing is performed in a device which is physically separate from the device which carries out the pre-processing of the video stream of images. For that reason, the method may further comprise providing the converted video stream of images to a motion detection processing device.

In other embodiments, the motion detection processing and the pre-processing of the video stream of images are performed by the same device. For that purpose, the method may further comprise applying motion detection processing to the converted video stream of images.

According to a second aspect of the invention, the above object is achieved by a computer program product comprising a computer-readable medium with computer code instructions for carrying out the method according to the first aspect.

According to a third aspect of the invention, the above object is achieved by a device for pre-processing a video stream for subsequent motion detection processing, comprising:

a receiver configured to receive a video stream of images, wherein each image in the video stream is represented by a first plurality of bits, a video stream enhancing component configured to enhance the video stream of images by, for each image in the video stream:

comparing the image to at least one previous image in the video stream so as to identify pixels where the image differs from the at least one previous image in the video stream, enhancing the image in those pixels where the image differs from the at least one previous image in the video stream, a converting component configured to convert the enhanced video stream of images so as to produce a converted video stream of images for subsequent motion detection processing, wherein each image in the converted video stream of images is represented by a second plurality of bits being lower than the first plurality of bits.

According to a fourth aspect, the above object is achieved by a system for pre-processing a video stream for subsequent motion detection processing, comprising:

a camera configured to capture a video stream of images, and a device for pre-processing a video stream according to claim 13, the device being configured to receive and pre-process the video stream of images captured by the camera.

The system may further comprise a motion detection processing device configured to receive a converted video stream from the device for pre-processing a video stream, and apply motion detection to the converted video stream.

The second, third, and fourth aspects may generally have the same features and advantages as the first aspect. It is further noted that the invention relates to all possible combinations of features unless explicitly stated otherwise.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

DETAILED DESCRIPTION OF EMBODIMENTS

The present invention will now be described more fully hereinafter with reference to the accompanying drawings, in which embodiments of the invention are shown. This invention may, however, be embodied in many different forms and should not be construed as limited to the embodiments set forth herein. The systems and devices disclosed herein will be described during operation.

Figure 1:
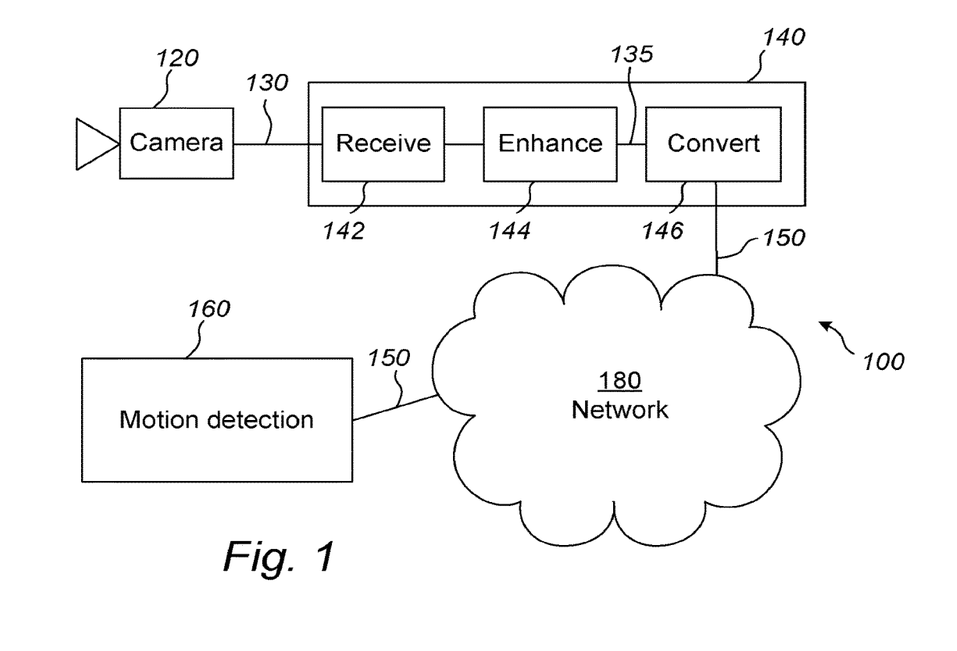
FIG. 1 illustrates a system for pre-processing of a video stream of images for subsequent motion detection processing according to embodiments.

FIG. 1 illustrates a system 100 for pre-processing a video stream, i.e. a sequence of images, for subsequent motion detection processing. The system 100 comprises a camera 120 and a device 140 for pre-processing a video stream of images captured by the camera 120. The system 100 may further comprise a motion detection processing device 160. The motion detection device 160 may for example be connected to the pre-processing device 140 via a network 180.

The camera 120 may generally be any type of digital camera which is capable of capturing a video stream of images of a scene. The camera 120 may work according to different principles. For example, the camera 120 may be a visible light camera or a thermal camera.

The camera 120 is operatively connected, via wire or wirelessly, to the pre-processing device 140. The pre-processing device 140 may be physically separate from the camera 120 as illustrated in FIG. 1, or may be integrated in the camera 120.

The pre-processing device 140 may comprise a receiving component 142, an enhancement component 144, and a converting component 146. The pre-processing device 140 is, via the receiving component 142, configured to receive a video stream of images 130 from the camera 120. The enhancement component 144 is generally configured to enhance the received video stream of images 130 to generate an enhanced video stream 135. Further, the converting component 146 is configured to convert, such as compress or reduce bit depth of, the enhanced video stream 135 of images so as to output a converted video stream of images 150. In particular, the images in the received video stream 130 may be represented by a first plurality of bits, and the images of the converted video stream 150 may be represented by a second, lower, plurality of bits due to the conversion. For example, the pixels in the images of the video stream 130 may be represented by 16 bits, while the pixels in the images of the converted video stream 150 may be represented by 8 bits. The conversion may thus be made from a first bit environment (a 16-bit environment) to a second bit environment (an 8-bit environment). The enhancement component 144 operates on images in the first, higher, bit environment, whereas the converted video stream 150 which is subsequently input to the motion detection processing device 160 is represented in the second, lower, bit environment. The conversion of the images from the first to the second bit environment enables streaming of the converted video stream 150 over the network 180.

The converted video stream of images 150 may subsequently be transmitted to a motion detection device 160. For that purpose the pre-processing device 140 may comprise a transmitting component (not shown). The transmitting component may e.g. be configured to transmit the converted video stream of images via a network 180. The network 180 may be any type of network being suitable for the purpose, such as a local area network or a wide area network.

The network 180 may typically have a limited bandwidth, and hence there is a limitation in the available bit rate. For example, the available bit rate may not be high enough to enable transmission of the video sequence 130. However, thanks to the conversion carried out by the converting component 146, the bit rate of the video sequence 130 is reduced to a bit rate which falls within the limits of the available bit rate.

The pre-processing device 140, and the components thereof, may be implemented in software or in hardware, or a combination thereof. In particular, the pre-processing device 140 may comprise a processor and a memory. The memory may act as a (non-transitory) computer-readable storage medium or device for storing computer code instructions which, when executed by the processor, are adapted to carry out any method disclosed herein.

The motion protection processing device 160 may generally be any device which is adapted to receive a video stream of images and to perform motion detection processing on the received video stream according to any known method. For example, the motion detection processing device 160 may implement any commercially available motion detection engine.

Figure 2:
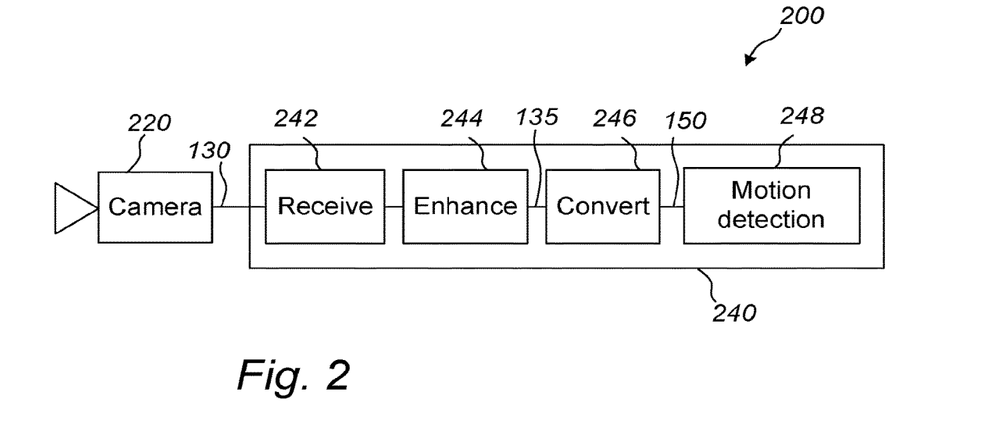
FIG. 2 illustrates a system for pre-processing of a video stream of images for subsequent motion detection processing according to other embodiments.

FIG. 2 illustrates an alternative system 200 for pre-processing a video stream for subsequent motion detection processing. The system 200 comprises a camera 220 and a pre-processing device 240. The difference between the system 200 and the system 100 of FIG. 1 is that the pre-processing device 240 includes a motion detection processing component 248 replacing the motion detection device 160. In other words, the motion detection processing is in system 200 carried out by the pre-processing device 240, whereas in system 100 the motion detection processing is carried out by a separate device.

Figure 3:
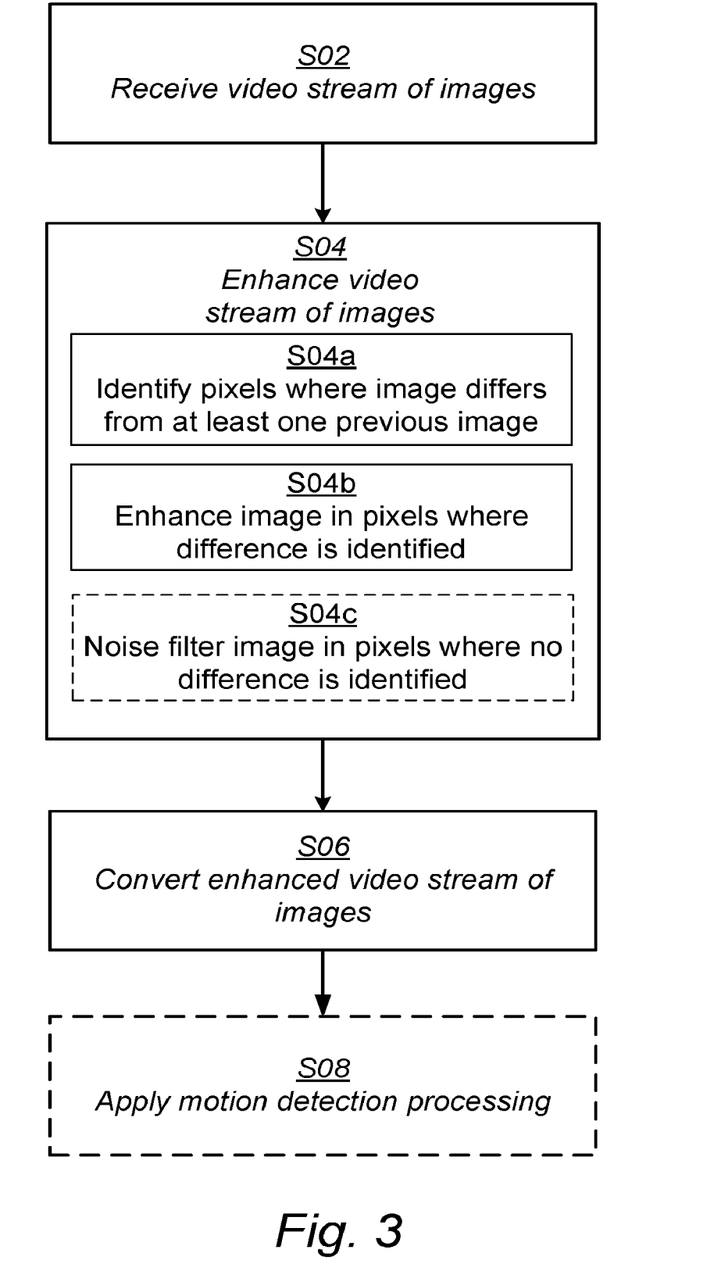
FIG. 3 is a flowchart of a method for pre-processing of a video stream of images for subsequent motion detection processing according to embodiments.

The operation of the systems 100 and 200, and in particular of the pre-processing device 140, 240, will now be described with reference to FIG. 1, FIG. 2, FIG. 4 and the flow chart of FIG. 3.

In step S02, the pre-processing device 140, 240, receives, via receiver 142, 242 a video stream of images 130 from the camera 120, 220. FIG. 4 illustrates a part $\{I_{t-3}, I_{t-2}, I_{t-1}, I_t\}$ of such a video stream of images 130. Here, $I_t$ represents a current image in the video stream, and $I_{t-3}, I_{t-2}, I_{t-1}$ are previous images in the received video stream 130. Here three previous images are illustrated. However, generally the number of previous images may take other values.

The received images $\{I_{t-3}, I_{t-2}, I_{t-1}, I_t\}$ may include stationary objects 402 and moving objects 404 (as indicated by the arrow). In the illustrated video stream, a moving object 404 is moving to the right. There may further be noise in the received images $\{I_{t-3}, I_{t-2}, I_{t-1}, I_t\}$, here indicated by a dotted background pattern.

In step S04, the enhancement component 144, 244 enhances the video stream of images 130. In more detail, for each image $I_{t-3}, I_{t-2}, I_{t-1}, I_t$ in the video stream 130, the enhancement component 144, 244, may carry out a number of substeps S04a, S04b, S04c. This procedure is described in the following with respect to image $I_t$.

In step S04a, the enhancement component 144, 244, compares the image $I_t$ to at least one previous image $I_{t-3}, I_{t-2}, I_{t-1}$ in the video stream 130. In the embodiment of FIG. 4, the image $I_t$ is, for reasons of illustration, compared to the previous image $I_{t-1}$. However, more generally, the image $I_t$ may be compared to an image formed from the at least one previous image $I_{t-3}, I_{t-2}, I_{t-1}$ such as a mean value or a temporal filtration of the at least one previous image $I_{t-3}, I_{t-2}, I_{t-1}$. This will be explained in more detail later on with reference to FIG. 5. In more detail, the enhancement component 144, 244 may compare the image $I_t$ to the previous image $I_{t-1}$ pixel-wise, e.g. by calculating differences between intensity values of individual pixels. If the difference (or the absolute value of the difference) in intensity values between the image $I_t$ and the at least one previous image $I_{t-1}$ exceeds a threshold in a pixel, then the enhancement component 144, 244 may determine that the image differs from the previous image in that pixel. In this way, the enhancement component may identify pixels where the image $I_t$ differs from the previous image $I_{t-1}$. This is further illustrated by image $D_t$ in FIG. 4, which in black shows pixels 406 where image $I_t$ differs from image $I_{t-1}$ by more than a certain threshold. The differences between image $I_t$ and the previous image $I_{t-1}$ may be found where there is motion in the images $I_{t-1}$, $I_t$, and in particular around the edges of the moving object 404. Since the moving object 404 in this case moves to the right, the differing pixels will show up at the front, right, edge and the back, left, edge of the moving object 404.

The enhancement component 144, 244 then proceeds to enhance the image $I_t$ in those pixels 406 where image $I_t$ differs from the at least one previous image $I_{t-3}$, $I_{t-2}$, $I_{t-1}$ (here represented by $I_{t-1}$) in the video stream 130. The enhancement typically involves applying a gain to the intensity values of pixels 406 in image $I_t$ that differ from the at least one previous image $I_{t-3}$, $I_{t-2}$, $I_{t-1}$. This may e.g. include adding an offset value to the pixel value of image $I_t$, and/or multiplying the pixel value of image $I_t$ by a gain factor. This is further illustrated by the enhanced image $I_t^e$ of FIG. 4 where the image $I_t$ is enhanced in pixels 408 corresponding to the pixels 406 where the image $I_t$ differs from the at least one previous image $I_{t-3}$, $I_{t-2}$, $I_{t-1}$. As may be seen in FIG. 4, the moving object 404 appears to be larger in the enhanced image in comparison to the original image $I_t$, thus making the object easier to detect during subsequent motion detection processing.

According to further examples, the enhancement component 144, 244 may further enhance the image $I_t$ in a surrounding of those pixels 406 where the image $I_t$ differs from the at least one previous image $I_{t-3}$, $I_{t-2}$, $I_{t-1}$. For example, the enhancement component 144, 244 may extend the pixel region 406 in image $D_t$ to also include surrounding pixels, such as adding a n×n neighbourhood, with n=1, 3, 5 etc., around each pixel in the region 406. In that way, a frame of pixels will be added to the pixel region 406.

In some embodiments, the enhancement component 144, 244 may further perform noise filtering of the image $I_t$. In particular, the enhancement component 144, 244, may apply a noise filter to those pixels in the image $I_t$ which do not differ from the at least one previous image $I_{t-3}$, $I_{t-2}$, $I_{t-1}$. Such pixels corresponds to the white portions 410 of the image $D_t$. The noise filter may generally be any type of noise filter used in the art. By way of example, it may be a temporal filter which filters noise based on the image $I_t$ and the at least one previous image $I_{t-3}$, $I_{t-2}$, $I_{t-1}$, for instance by temporally averaging (or forming weighted averages) the image $I_t$ and the at least one previous image $I_{t-3}$, $I_{t-2}$, $I_{t-1}$. In FIG. 4, $I_t^{e,noise}$ represents an image which is enhanced in pixel regions 406 where the image $I_t$ differs from the at least one previous image $I_{t-3}$, $I_{t-2}$, $I_{t-1}$ and which is noise filtered in pixel regions 410 where the image $I_t$ does not differ from the at least one previous image $I_{t-3}$, $I_{t-2}$, $I_{t-1}$, as represented by the less dense dotted background pattern in $I_t^{e,noise}$.

The enhanced image $I_t^3$ or $I_t^{e,noise}$ is then subject to conversion by the converting component 146, 246. The purpose of the conversion is to convert the video stream of enhanced images 135 to a format which is suitable for transmittal ("streaming") over the network 180 and/or which is suitable for a standard, commercially available, motion detection processing engine. In more detail, the images $I_t^e$, $I_t^{e,noise}$ of the enhanced video stream are represented by a first plurality of bits. The conversion component 146, 246 converts the images $I_t^e$, $I_t^{e,noise}$ of the enhanced video stream to a video stream in which each image is represented by a lower number of bits.

For example, the conversion component 146, 246 may convert the images $I_t^e$, $I_t^{e,noise}$ of the enhanced video stream by performing video compression according to any known method, thereby decreasing the amount of bits required to represent each image in the video stream.

According to other examples, the converting component 146, 246 converts the enhanced video stream by reducing the bit depth of the images $I_t^e$, $I_t^{e,noise}$ in the enhanced video stream. More specifically, each pixel of the images of the video stream 130 and thereby also the images of the enhanced video stream 135 may be represented by a first number of bits, such as 16 bits, referred to herein as the bit depth. The converted images may have a lower bit depth, such as 8 bits. The converting component 146, 246 may reduce the bit depth in any known manner. For example, consider the situation where a pixel before conversion is represented by 16 bits. This means that the value in the pixel before conversion may take $2^{16}$ different values. The conversion may then proceed to map the first $2^8$ of these values to a first converted value, the following $2^8$ values to a second converted value etc. In this way, the pixels in the converted image may take $2^8$ different values, and may hence be represented by 8 bits. This approach may of course be generalized to a situation where the pixels before and after the conversion are represented by arbitrary numbers of bits.

It may also be the case that at least the converted video stream has a plurality of color channels. The conversion component 146, 246 may then use the plurality of color channels such that the pixels 406 where the image $I_t$ differs from the at least one previous image $I_{t-3}$, $I_{t-2}$, $I_{t-1}$ are given different weights in the different color channels in comparison to pixels 410 where the image $I_t$ does not differ from the at least one previous image $I_{t-3}$, $I_{t-2}$, $I_{t-1}$. In this way, pixels corresponding to a detected motion may be given a different color, i.e. be color-coded, in comparison to pixels where no motion is detected.

Consider the case where the images $I_{t-3}$, $I_{t-2}$, $I_{t-1}$, $I_t$ in the video stream 130 are gray-scale images, i.e. where each pixel of the images in the video stream 130 are represented by a first number of bits in a single color channel, and the images in the converted video stream are color images, i.e. where each pixel of the images in the converted video stream are represented by a second number of bits divided between a plurality of color channels. For example, the images before conversion may be represented by 16 bits in a one color channel, and the images after conversion may be represented by 8 bits in each of three color channels, such as a red, a green, and a blue color channel.

For pixels 410 for which no difference was identified, the converting component 146, 246 may assign the same value in all color channels. In that way, those pixels 410 will look gray in the images of the converted video sequence.

For pixels 406 for which a difference was identified, the converting component 146, 246 may assign different values to some of the plurality of color channels in the converted image. For example, those pixels 406 may only be coded in one of the color channels, such as the green channel, or in two of the color channels. Alternatively, different weights may be applied to the different color channels so as to obtain a distribution between the color channels.

It is to be noted that the opposite is also possible, such that pixels 406 for which a difference was identified are coded in gray-scale, i.e. are assigned the same value in all color channels, and that pixels 410 for which no difference was identified are coded in color, i.e. are assigned different values in at least some color channels.

It may be the case that also the images $I_{t-3}$, $I_{t-2}$, $I_{t-1}$, $I_t$ in the video stream 130 are color images, i.e. that each pixel of the images in the video stream 130 are represented by a first number of bits divided between a plurality of color channels. For example, the images in the video stream 130 may be represented by 16 bits in each of three color channels, and the images after conversion may be represented by 8 bits in each of three color channels.

For pixels 410 for which no difference was identified, the converting component 146, 246 may keep the balance between the color channels, i.e. for such pixels 410 the distribution between the color channels is the same in the images of the video stream 130 and the converted video stream 150.

For pixels 410 for which a difference is identified, the converting component 146, 246 may modify the balance between the color channels, i.e. for such pixels 410 the distribution between the color channels in the converted video stream 150 is modified in comparison to the distribution between the color channels in the video stream 130. For example, the converting component 146, 246 may convert the video stream 130 such that moving objects in the images of the converted video stream 150 are a bit more red than the color in remaining parts of the images.

In step S08, the motion detection processing device 160, or the motion detection processing component 248 may perform motion detection on the converted video stream 150. As further discussed above, the motion detection processing may be carried out according to any known method in the art.

Figure 4:
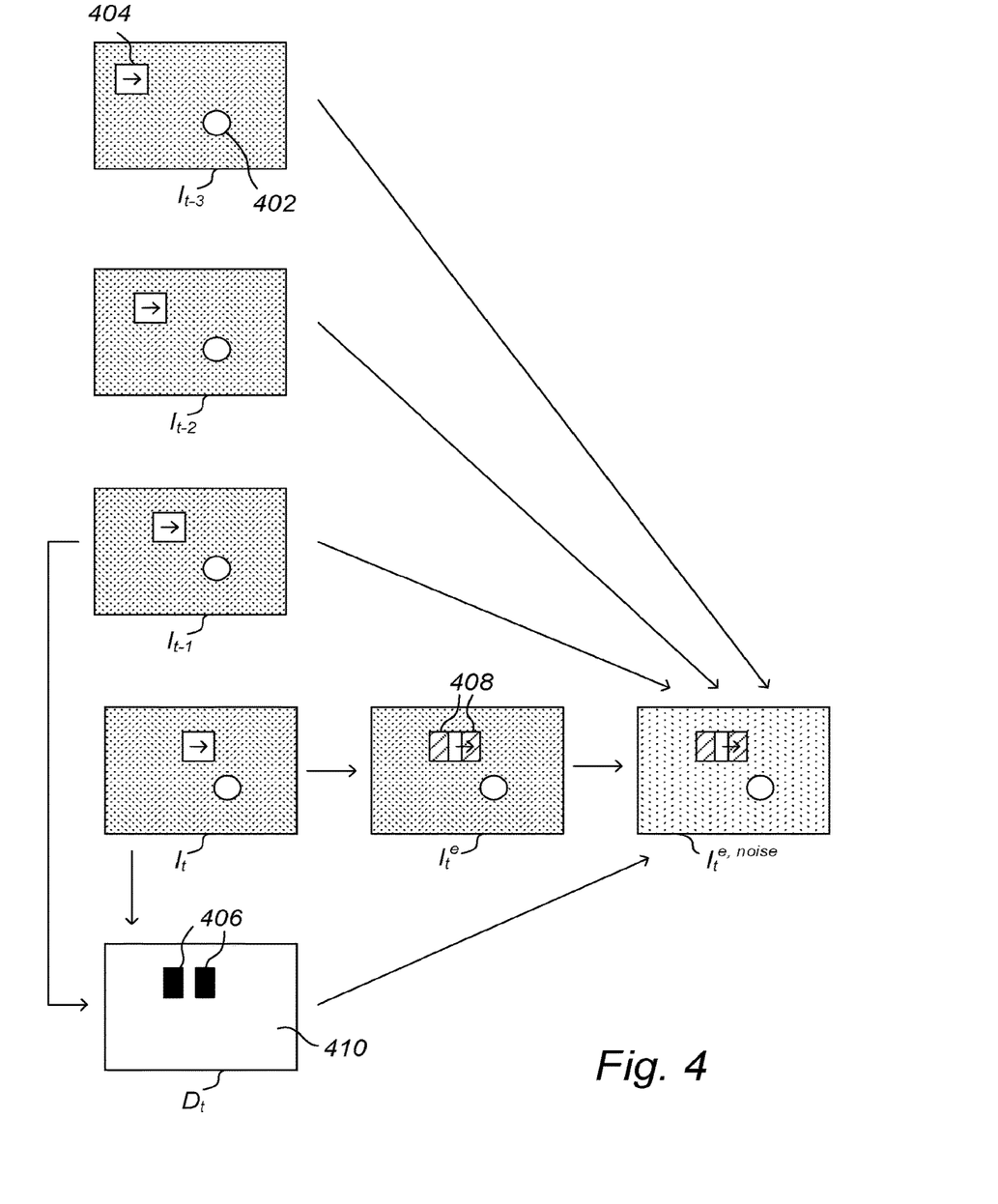
FIG. 4 schematically illustrates enhancement of a video stream of images according to embodiments.

In the embodiment of FIG. 4, the enhancement component 144, 244, in step S04a, compared the image $I_t$ to the previous image $I_{t-1}$ in order to identify pixels where the image $I_t$ differs from the previous image $I_{t-1}$. An embodiment where the enhancement component 144, 244 compares the image $I_t$ to an image formed from the at least one previous image $I_{t-3}$, $I_{t-2}$, $I_{t-1}$ in the video stream 130 will now be explained with reference to FIG. 5.

Figure 5:
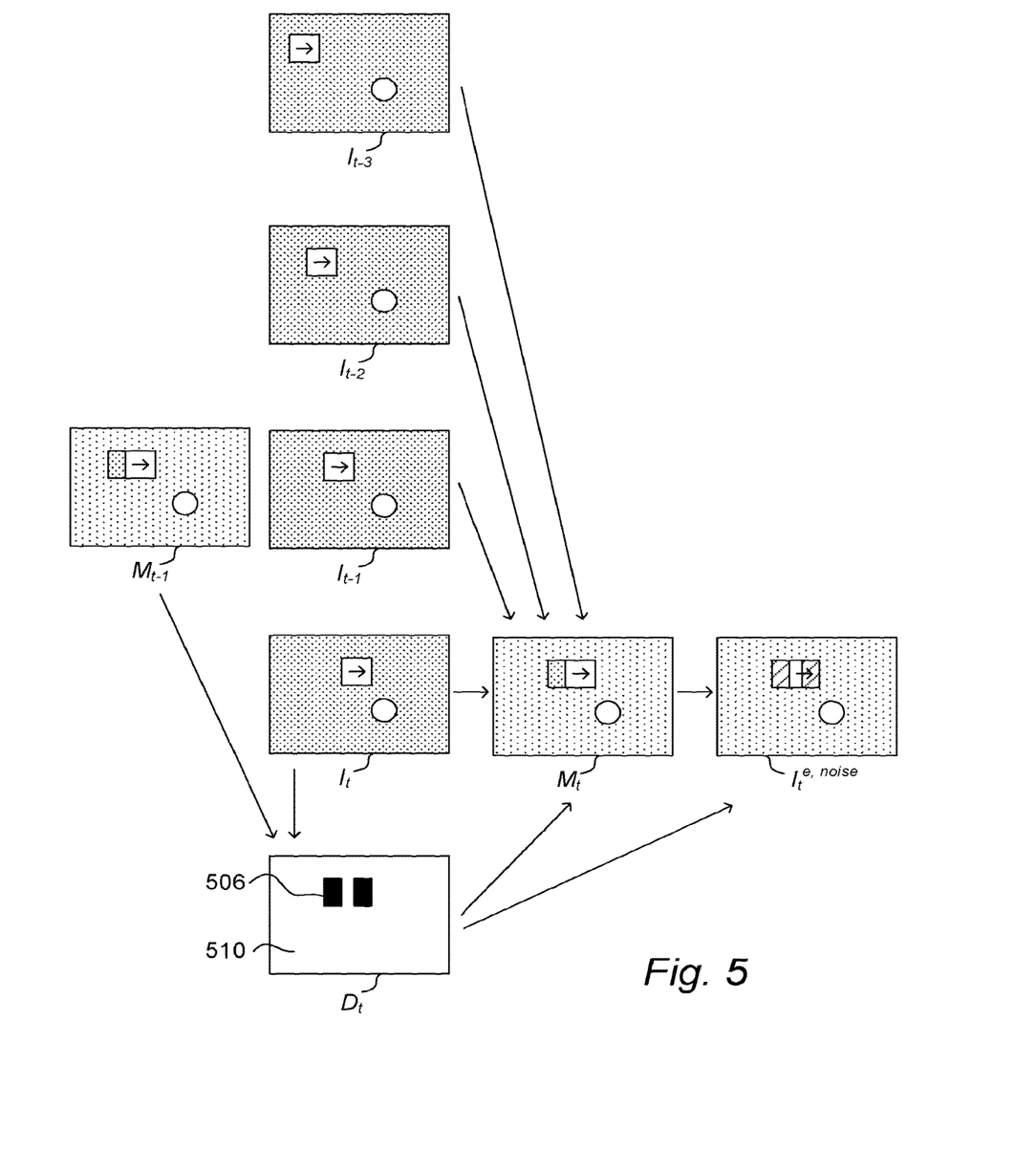
FIG. 5 schematically illustrates combined noise filtering and enhancement of a video stream of images according to embodiments.

The enhancement component 144, 244 may work in an iterative manner, where each iteration corresponds to a point in time t. In each iteration, the enhancement component 144, 244 may form an image $M_t$ from images $I_{t-n}, \ldots, I_{t-1}, I_t$, where n is a predefined number. The iteration may be initiated by setting $M_0 = I_0$.

In the t:th iteration, the enhancement component 144, 244, may form the image $M_t$ by first identifying the differences between image $I_t$ and an image $M_{t-1}$ determined in the previous iteration on basis of images $I_{t-1-n}, \ldots, I_{t-2}, I_{t-1}$, cf. step S04a. This identification may be done in accordance to what was described in conjunction with FIG. 4, e.g. by calculating differences and comparing the differences to a threshold. The result of such identification of differences is illustrated by image $D_t$ of FIG. 5. $D_t$ shows pixels 506 where differences are identified in black, and pixels 510 where no differences are identified in white.

The enhancement component 144, 244 may then determine image $M_t$ in pixel p according to:

$$M_t(p) = \begin{cases} f(I_{t-n}(p), \ldots, I_{t-1}(p), I_t(p)), & \text{if } |I_t(p) - M_{t-1}(p)| < T \\ I_t(p), & \text{if } |I_t(p) - M_{t-1}(p)| \geq T \end{cases},$$

where $f$ is a function, such as a filtration or a (weighted) mean value, of the value of the corresponding pixel p in images $I_{t-n}, \ldots, I_{t-1}, I_t$, and T is a threshold value. Expressed in words, $M_t$ is hence formed by temporally filtering images $I_{t-n}, \ldots, I_{t-1}, I_t$ in pixels 510 where no difference is found between the image $I_t$ and image $M_{t-1}$ from the previous iteration (cf. step S04c), and by keeping the value of image $I_t$ in pixels 506 where a difference is found. Since the filtering typically is an averaging operation, the image $M_t$ is thus a noise-filtered version of $I_t$ in pixels 510 where no differences are identified (i.e. no motion is detected) and equal to $I_t$ in pixels 506 where differences are identified (i.e. where motion is detected).

The enhancement component 144, 244 may further base the enhancement performed in step S04b on the image $M_t$. In more detail, the enhancement component 144, 244, may enhance the image $M_t$ in pixels where a difference was detected so as to generate en enhanced image $I_t^{e,noise}$ according to:

$$I_t^{e,noise}(p) = \begin{cases} M_t(p), & \text{if } |I_t(p) - M_{t-1}(p)| < T \\ \text{Enhancement}(M_t(p)), & \text{if } |I_t(p) - M_{t-1}(p)| \geq T \end{cases} =$$

$$\begin{cases} f(I_{t-n}(p), \ldots, I_{t-1}(p), I_t(p)), & \text{if } |I_t(p) - M_{t-1}(p)| < T \\ \text{Enhancement}(I_t(p)), & \text{if } |I_t(p) - M_{t-1}(p)| \geq T \end{cases}.$$

For pixels where no difference is detected between $I_t$ and $M_{t-1}$, the enhanced image $I_t^{e,noise}$ is thus a temporal filtration, such as a noise filtration, of images $I_{t-n}, \ldots, I_{t-1}, I_t$, and in pixels where a difference is detected between $I_t$ and $M_{t-1}$, the enhanced image $I_t^{e,noise}$ is an enhancement of image the image $I_t$. As described with reference to FIG. 4, the enhancement may e.g. include adding a (pre-defined) offset to the pixel value, and/or multiplying the pixel value by a gain factor.

With this approach, the enhancement may thus be conveniently combined with, i.e. performed in the same step, as noise filtering.

It will be appreciated that a person skilled in the art can modify the above-described embodiments in many ways and still use the advantages of the invention as shown in the embodiments above. Thus, the invention should not be limited to the shown embodiments but should only be defined by the appended claims. Additionally, as the skilled person understands, the shown embodiments may be combined.

The invention claimed is:

1. A method for motion detection processing of a video stream, comprising:
   receiving a video stream of images, wherein each image in the video stream is represented by a first plurality of bits,
   enhancing the video stream of images by, for each image in the video stream:
      comparing the image to at least one previous image in the video stream so as to identify pixels where the image differs from the at least one previous image in the video stream,
      enhancing the image in those pixels where the image differs from the at least one previous image in the video stream,
   converting the enhanced video stream of images so as to produce a converted video stream of images, wherein each image in the converted video stream is represented by a second plurality of bits being lower than the first plurality of bits, and
   applying motion detection processing to the converted video stream of images.

2. The method of claim 1, wherein each pixel of the images in the video stream is represented by a first number of bits, and the step of converting the enhanced video stream of images comprises converting the enhanced video stream of images such that each pixel of the images in the converted video stream is represented by a second number of bits being lower than the first number of bits.

3. The method of claim 1, wherein, in the step of comparing the image to at least one previous image in the video stream, the image is compared to an image formed from the at least one previous image in the video stream.

4. The method of claim 1, wherein, in the step of enhancing the image, an offset is added to a pixel value in those pixels where the image differs from the at least one previous image in the video stream.

5. The method of claim 1, wherein, in the step of enhancing the image, a pixel value in those pixels where the image differs from the at least one previous image in the video stream is multiplied by a gain factor.

6. The method of claim 1, wherein in the step of enhancing the image, the image is further enhanced in a surrounding of those pixels where the image differs from the at least one previous image in the video stream.

7. The method of claim 1, wherein the step of enhancing the video stream of images further comprises, for each image in the video stream:

noise filtering the image in those pixels where the image does not differ from the at least one previous image in the video stream.

8. The method of claim 7, wherein the noise filtering comprises temporally averaging the image using the at least one previous image in the video stream.

9. The method of claim 1, further comprising providing the converted video stream of images to a motion detection processing device.

10. A computer program product comprising a non-transitory computer-readable medium with computer code instructions for carrying out the method according to claim 1.

11. A device, comprising:
a receiver configured to receive a video stream of images, wherein each image in the video stream is represented by a first plurality of bits,
a video stream enhancing component configured to enhance the video stream of images by, for each image in the video stream:
comparing the image to at least one previous image in the video stream so as to identify pixels where the image differs from the at least one previous image in the video stream,
enhancing the image in those pixels where the image differs from the at least one previous image in the video stream,
a converting component configured to convert the enhanced video stream of images so as to produce a converted video stream of images,
wherein each image in the converted video stream of images is represented by a second plurality of bits being lower than the first plurality of bits, and one of:
a transmitting component configured to transmit the converted video stream of images via a network to a motion detection device for subsequent motion detection processing; and
a motion detection processing component configure to perform motion detection processing on the converted video stream.

12. A system for motion detection processing of a video stream, comprising:
a camera configured to capture a video stream of images,
a device according to claim 11, the device being configured to receive the video stream of images captured by the camera.

13. The system of claim 12, further comprising:
a motion detection processing device configured to receive a converted video stream from the device, and apply motion detection processing to the converted video stream.

* * * * *